United States Patent [19]

Smith

[11] Patent Number: 5,400,576

[45] Date of Patent: Mar. 28, 1995

[54] MULCHING DEVICE FOR REEL-TYPE LAWN MOWERS

[76] Inventor: Jerry R. Smith, 24706 Dracaea Ave., Moreno Valley, Calif. 92553

[21] Appl. No.: 80,288

[22] Filed: Jun. 21, 1993

[51] Int. Cl.$^6$ .......................................... A01D 57/02
[52] U.S. Cl. ...................................... 56/249; 56/294; 56/320.1; 56/DIG. 20
[58] Field of Search ...................... 56/13.7, 16.9, 13.6, 56/252, 249, 294, DIG. 20, 7, 251, DIG. 24, 320.1; 172/112, 258, 509, 508, 513

[56] References Cited

U.S. PATENT DOCUMENTS

| | | |
|---|---|---|
| 1,010,318 | 11/1911 | Regan . |
| 2,486,969 | 11/1949 | Nelson . |
| 2,517,184 | 8/1950 | Elliott et al. . |
| 2,685,774 | 8/1954 | Williams . |
| 2,715,810 | 8/1955 | Beneke . |
| 2,759,321 | 8/1956 | Force . |
| 2,979,879 | 4/1961 | Reynolds et al. . |
| 5,133,176 | 7/1992 | Baumann et al. .................. 56/320.1 |

*Primary Examiner*—Ramon S. Britts
*Assistant Examiner*—Pamela O'Connor
*Attorney, Agent, or Firm*—Knobbe, Martens, Olson & Bear

[57] ABSTRACT

A mulching device for a reel-type mowing machine, especially power-driven machines, wherein the mulching device is mounted to the front of a reel-type lawn mower such that the device is in substantially closely spaced relationship to the rotating reel assembly, and above a portion of the reel assembly so as to direct a significant portion of the particles generated by the cutting action of the reel in front of the reel assembly for more complete comminution and eventual deposition upon the turf surface.

31 Claims, 3 Drawing Sheets

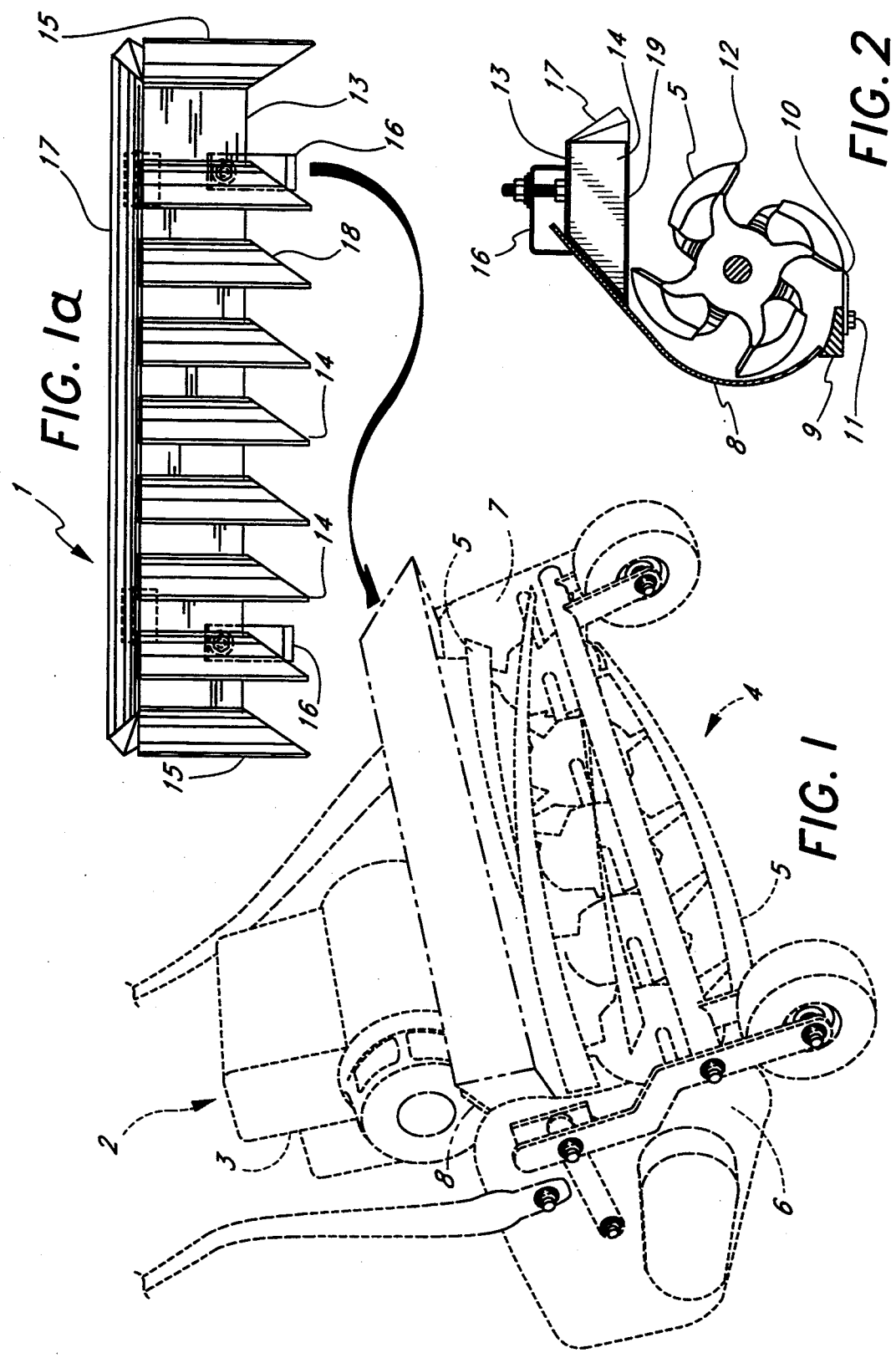

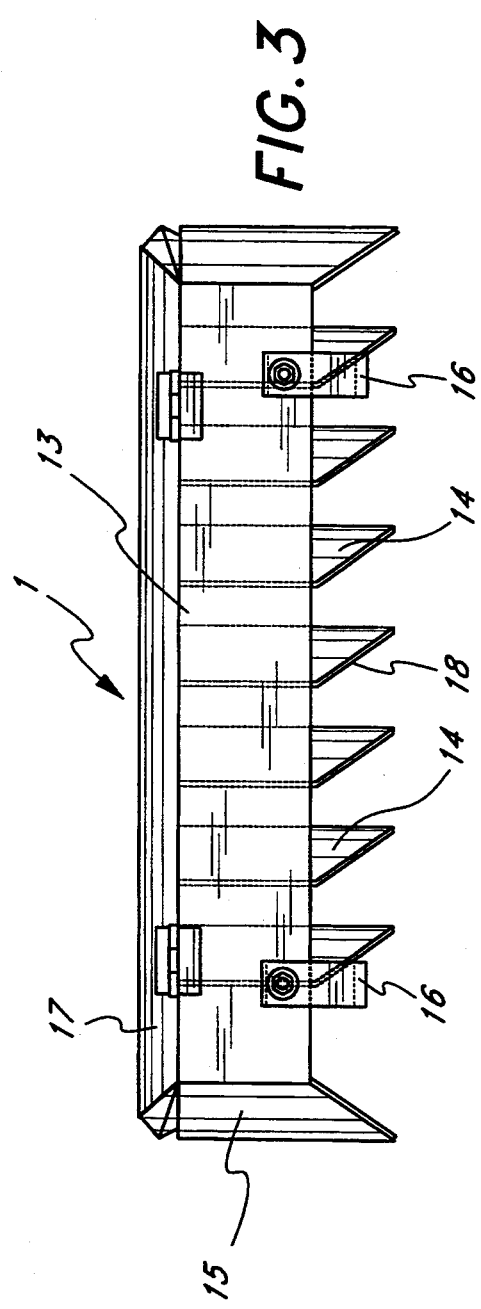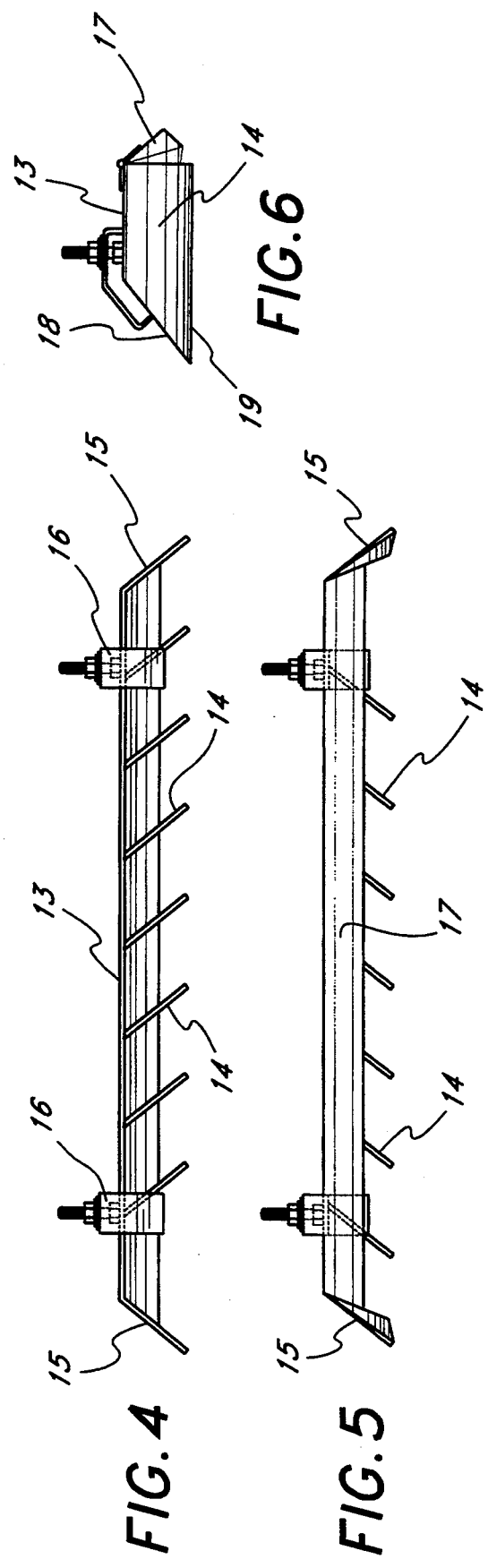

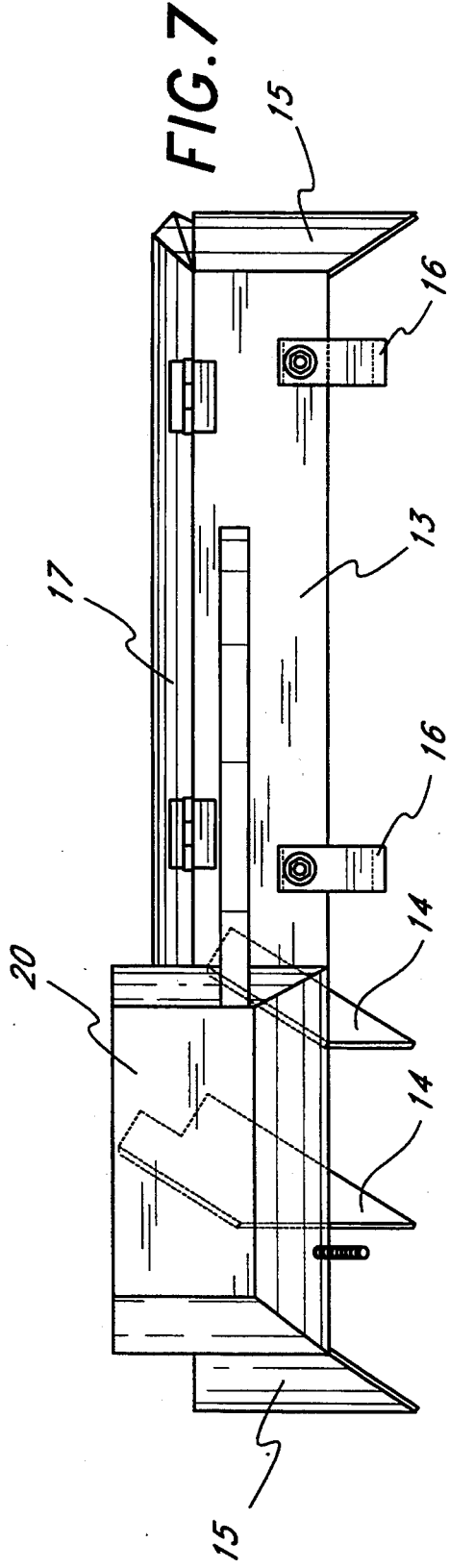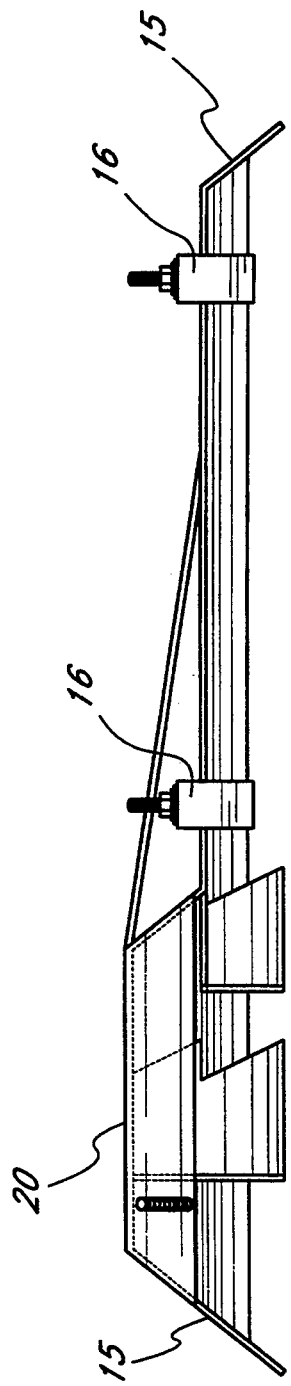

MULCHING DEVICE FOR REEL-TYPE LAWN MOWERS

FIELD OF THE INVENTION

This invention is concerned with a mulching device for reel-type lawn mowers and with reel-type lawn mowers incorporating the device. The device is particularly adapted for use on a powered reel-type lawn mower.

BACKGROUND OF THE INVENTION

Generally, there are two types of lawn mowers: rotary lawn mowers in which a single blade rotates about an axis perpendicular to the ground, and reel-type lawn mowers that have a series of blades mounted on a reel that rotates about an axis parallel to the ground. This invention is particularly concerned with a mulching device for use on a powered, as opposed to a manual, reel-type lawn mower.

With increasing regulation of landfills and a shortage of sites due to urban expansion, there is an increasing demand to avoid or minimize the use of landfills for grass cuttings from domestic gardens, parks, golf courses and the like. Indeed, some landfills now prohibit the deposit of such lawn cuttings. Thus, with environmental awareness increasing and as landfill space decreasing, the need for practical and cost-effective alternatives for the disposal of grass cuttings is growing.

Further, lawn fertilizers are expensive and many contain active chemicals that are not environmentally sound. It is well known that finely cut mulch can have beneficial horticultural properties when utilized as a fertilizer. The beneficial horticultural properties of a fine mulch include reducing evaporation, maintaining constant soil temperature, preventing erosion, controlling weeds, and enriching the soil. There is therefore a need for a simple, effective and inexpensive mulcher of cut grass that will recycle grass cuttings as a fertilizer for lawns and parks. This need is met with the present invention, the use of which may greatly reduce or eliminate the need for a fertilizer on a lawn.

Furthermore, in arid states, particularly those such as California where water is often in short supply, an efficient grass mulcher may provide additional benefits. Where the grass is sufficiently, finely and properly mulched, the mulch collects around the base of the grass and not only nourishes it, but also reduces water evaporation from the grass and the soil around its roots, so that less water may be required to maintain the grass. There is therefore a need for a simple and effective device that will properly and finely mulch grass cuttings to increase water retention in the lawn. The present invention also achieves these objectives.

Furthermore, in addition to the environmental and horticultural advantages already discussed, the mulching device of the present invention also increases the aesthetics of the lawn. In conventional mowing, cut grass is often dropped on the lawn, either because the grass catcher is left off or it leaks during use. This produces unsightly streaks and rows of cut grass extending across the lawn. These rows of cut grass, if not raked or vacuumed, will later dry out and spoil the appearance of a lawn. Use of the device of this invention while mowing the lawn eliminates this problem. Thus, the lawn may be kept smooth and aesthetically pleasing.

Mulching devices for manual reel-type lawn mowers are known. For example, U.S. Pat. No. 2,517,184 to Elliott, et al. discloses a hood which is mounted over the cutting reel and which has spiral-shaped ribs located on its underside for directing cut grass back into the cutting reel to be recut for mulching. However, Elliott is concerned only with manual, non-powered lawn mowers. The spiral-shaped design in Elliott is also of little or no practical utility in powered mowers, because the increased volume and speed of grass cuttings in such mowers would clog such a design in a power mower, especially if the grass was wet. Moreover, in Elliott, the ribs are perpendicular with respect to the hood for the mower. The applicant has found that such ribs decrease the velocity of cut grass too much in a power mower. Thus, in a power mower the discharged grass impinges on such ribs at a high angle and loses a substantial amount of velocity. This adversely affects performance of the mower.

The hood arrangement in Elliott also is unsuitable for use in a power mower because the space between the blades and hood would be too great in a power mower and would therefore tend to build up grass in that space and clog the machine. Power mowers require a hood or shield that is quite close to the blades, so that cut grass is brought up and over the top of the reel with enough force to prevent clogging.

In any event, manually operated reel-type lawn mowers, such as shown in Elliott, are disfavored nowadays. Power reel-type lawn mowers are much preferred for their speed and efficiency, especially by commercial gardeners. There is therefore a need for practical mulching devices for power reel-type lawn mowers. That is satisfied by the present invention.

Some commercial power reel mowers on the market today have a rib like structure in the passageway between the reel and the shield or hood behind the reel. Certain mowers made in the United States by King-O-Lawn in the 1950's and 1960's and by McLane in the 1970's have a series of ribs in the outlet to that passageway that are perpendicular to the surface to which they are attached and which are for directing the cut grass upwardly and forwardly into a grass catcher attached to the mower. Thus such mowers perform no mulching function.

Accordingly, the above objectives are met by the mulching device of the present invention, which is designed to be mounted on conventional powered reel-type mower machines so as to direct the flow of cut grass into the blades for more complete comminution, so as to reduce the bulk of the clippings and thus distribute them upon the turf as a mulch having beneficial horticultural properties.

SUMMARY OF THE INVENTION

The invention provides a mulching device which may be attached to a standard powered reel-type mowing machine, especially power-driven machines, wherein the mulching device is adapted to direct cut grass to the front of the rotating reel assembly for more complete comminution and eventual deposition upon the turf surface.

In one embodiment of this invention, there is provided a mulching device, adapted for mounting to a reel-type lawn mower, said device comprising: an elongate plate having an underside surface; a plurality of substantially parallel planar vanes depending from said surface, said vanes being arranged at an angle to the perpendicular to said surface; means for attaching said device to an outlet of a lawn mower; said underside surface and said vanes forming channels to, in use on said mower, direct grass cut by the mower to be recycled through the mower for further cutting and deposition on the ground as a mulch.

Preferably, the vanes are spaced substantially evenly across the underside of said plate.

Preferably, the device is adapted for mounting to the shield for the blades and to position the device in the outlet for cut grass between the blades and that shield. The vanes on the device may be shaped to substantially mate with the surface of the shield, so as to better form channels for directing the cut grass. In a preferred embodiment, the vanes are generally trapezoidal in shape, being a quadrilateral with two parallel sides and two ninety degree angles. The acute angle of said vanes may then be pointed into the discharge opening of the mower, with the angled surface of each vane mating with the under surface of the shield for better directing of the discharged grass cuttings.

More specifically, the mulching device of the invention preferably is adapted to be mounted by clamps to the front of a powered reel-type lawn mower such that the device is in substantially closely spaced relationship to the rotating reel assembly, and above a portion of the reel assembly so as to direct a significant portion of the particles generated by the cutting action of the reel in front of the reel assembly for more complete comminution. Without the device, a front discharge reel-type mower would discharge the grass cuttings up into the air and approximately 2-3 feet in front of the mower.

The mulching device of the present invention utilizes the air current created by the revolving blades on a powered reel-type mower which acts to disperse the cut grass in front of the mower where it is recut into fine particles before it is finally deposited as a mulch to the ground. Preferably, a substantial portion of the cut grass discharged through the mulching device is directed by that device on to the mower blades to be swept up by the blades and the air current associated with them for recutting until the grass cuttings are so fine that they settle on the ground as mulch.

As indicated above, the mulching device preferably comprises a plate, to which is attached across the underside a series of planar parallel vanes. When mounted on the lawn mower, the vanes are positioned with their edges close to the blades on the reel to form channels between the vanes and with the plate that direct downwardly cut grass thrown forward by the rotating reel to be swept up again by the reel and further cut. This repetitive cutting produces a fine mulch that settles between the grass in the lawn. This serves to nourish the lawn without being unsightly and avoids the need to dispose of grass cuttings or keep them in a separate mulch collector. It has been found that the device of this invention permits grass to be cut to a surprisingly short length, which would normally harm the grass. This has the advantages of improving the appearance of the lawn and reducing the frequency with which it needs to be cut.

Because the blades on a reel-type mower are arranged helically around the reel, cut grass tends to be ejected from the front of the lawn mower in a sideways direction, perpendicular to the blades, depending upon the direction of the spiral of the blades. Therefore, in order to counter this effect and deflect the cut grass straight ahead of the lawn mower, the planar vanes are preferably arranged parallel to an axis running from the front to the back of the mower. Further, the disclosed vanes are preferably set at an angle with respect to the top plate of the device. Thus, the discharged grass impinges on the vanes at a low angle with little loss of velocity. This reduces or prevents the device becoming loaded and clogged with grass cuttings, especially in overgrown or wet grass. The angled vanes also facilitate the grass being spread evenly such that it is not deposited in unsightly rows or lumps.

In one embodiment of this invention, the plate preferably has a forward edge along which is mounted or formed a downwardly projecting flap for increasing the downward deflection of the cut grass. That flap is preferably hingeably attached to that edge of the plate.

The flap along the front edge of the plate normally increases the downward deflection of cut grass forward of the rotating reel. However, in cases where the bulk of the cut grass is excessive (i.e. the grass is overgrown or is wet) the flap may be lifted open in order to allow better flow of the grass and to prevent clogging.

In another embodiment, a novel skirt is provided to further increase the versatility and efficiency of the mulching device when leaves are present on the lawn surface. A generally rectangular skirt (not shown) may be provided along the forward edge of the plate and extending vertically downward from that edge close to the ground. Such a skirt serves to trap leaves for mulching by the mower, which would otherwise escape because of their light weight, especially under windy conditions. As a result, leaves as well as grass can be cut into fine pieces and evenly deposited on the ground to form a mulch for the grass, thus making it virtually unnecessary to rake the lawn.

In another embodiment, the planar vanes are attached to the underside of the plate, but only partially across the underside of the plate beginning at one end of the device. This embodiment may also utilize a flap, preferable hinged, to the leading edge of the plate for directing the grass toward the side of the device with the vanes. The side of the device with the vanes is fabricated with a raised hood to allow for the increased volume of particulate matter.

This invention also provides mowers incorporating the mulching device. In one such embodiment the lawn mower comprises: a frame having depending side walls; a plurality of wheels supporting the frame and enabling the mower to travel over a turf surface; a motor mounted on the frame; an axially rotatable reel within the frame, the reel including a plurality of cutting blades, and extending substantially transversely to the direction of travel of the mower and being rotatably mounted between the side walls for rotation by the motor, the mower being adapted to travel along a turf surface and to cut grass by the rotation of the reel adjacent a cutting surface; an arcuate shield mounted between the side walls and behind the reel, the shield generally conforming to and mounted closely to the arcuate periphery defined by the blades when they rotate, the shield having a substantially smooth inner surface so that the surface and blades define between them an unobstructed passageway for the cut grass and an outlet from the passageway at the front of the mower for ejecting the cut grass forwardly; and a mulching device located in the outlet and comprising an elongate plate extending substantially across the outlet, the plate having an underside surface having a plurality of vanes, the vanes and the underside surface forming channels for directing, in use, the cut grass downwardly and in front of the mower so that a substantial portion of the cut grass is recycled through the mower for further cutting and eventual deposition upon the turf surface.

Preferably, the arcuate shield conforms generally to the periphery defined by the reel blades while rotating, at least in the area behind the reel, but does not extend downwardly in the area in front of the top center of the reel. Preferably the shield diverges away from the periphery of the reel in the area directly above the reel axle to form there an outlet for the cuttings. The shield should be closely positioned to the reel in the area in which it conforms to the periphery of the reel, so as to enhance the travel of cuttings through the mower. Preferably, the distance between the shield and the reel in this area is about ⅛ to ¼ inch.

In another embodiment of the invention there is provided a lawn mower comprising: a frame having a top wall and depending side walls, supported by a plurality of wheels; a motor mounted on the frame; a reel mounted within the frame for rotation by the motor, the reel including a plurality of cutting blades, and extending substantially transversely to the direction of travel of the mower, the mower being adapted to travel along a turf surface and to cut grass through the rotating action of the reel; and a mulching device located on the frame in closely spaced relationship to the reel, the device comprising a plate and a plurality of planar parallel vanes attached to the underside of the plate, such that the vanes are positioned with their edges close to the blades to form channels between the vanes and the plate affording flow paths for cut grass through the device, the vanes being located and arranged substantially parallel to an axis running from the front to the back of the mower and at an acute angle to the plate in order to direct the cut grass downwardly and in front of the rotating reel for recutting and eventual deposition upon the turf surface.

Preferably, the mulching device is located along the top side of said reel.

The invention also provides a mower for cutting grass comprising: a housing; a rotatable reel in the housing and having blades for cutting grass: a motor connected to rotate the reel; a shield in the housing closely adjacent the back side of the reel for conducting cut grass between the blades and the shield upwardly and to a discharge opening where the shield terminates; and means extending from the opening for directing the cut grass discharged through the opening to the blades for recutting to form a fine mulch to be deposited on the ground, the directing means comprising a plurality of deflection surfaces and means for attaching the directing means to the shield or housing so that, in use, grass conducted by the shield is supplied to the directing means and impinges the deflection surfaces to be spread substantially evenly on the ground in front of the mower.

Preferably, the deflection surfaces comprise a series of substantially parallel ribs, which are preferably arranged at substantially even intervals across the width of the area of discharge of cut grass from the mower. As indicated, above, the ribs are preferably disposed at an angle to the predominant direction of discharge of cut grass from the mower, so as to redirect that discharge in the direction of travel of the mower and to spread said cut grass substantially evenly over the ground in the path of the mower.

Preferably, the housing conforms generally to the periphery defined by the reel blades while rotating, but does not extend downwards in the area forward of the top center of the reel.

The invention also provides methods of mulching cut grass using the mulching devices and mowers of the invention.

BRIEF DESCRIPTION OF THE DRAWINGS

Some preferred embodiments of the invention will now be more particularly described with reference to the accompanying drawings.

FIG. 1 is a perspective view showing a mulching device of the invention, and how it may be attached to a powered lawn mower;

FIG. 1a is an underside view of a mulching device of the invention;

FIG. 2 is a schematic side view showing a mulching device Of the invention attached to a powered lawn mower;

FIG. 3 is a top view of a mulching device of the invention;

FIG. 4 is a rear elevation view of the mulching device shown in FIG. 3;

FIG. 5 is a front elevation view of the mulching device shown in FIG. 3;

FIG. 6 is an side view of the mulching device shown in FIG. 3;

FIG. 7 is a top view of another mulching device of the invention;

FIG. 8 is a rear elevation view of the mulching device shown in FIG. 7.

DESCRIPTION OF THE PREFERRED EMBODIMENTS

Referring to the drawings, FIG. 1 illustrates how a preferred mulching device 1 of this invention may be mounted to the front of a powered reel-type lawn mower 2. Such a mower comprises a motor 3 connected to drive a reel 4, upon which is mounted a series of spiral cutting blades 5. The mower shown in FIG. 1 is tilted backwards, so that the reel assembly can be more clearly seen. Reel 4 is rotatably mounted between side walls 6 and 7. Extending from beneath and behind the reel is an arcuate shield 8 that, in use, serves to direct cut grass up and over the reel 4 to be projected forwardly from the mower.

As can be seen more clearly in FIG. 2, shield 8 abuts a shoe 9 at the underside of the mower. Shoe 9 retains a knife 10, which is removably attached, such as by screw 11, to shoe 9, so that the knife can be removed for sharpening. As shown, knife 10 is closely positioned with respect to the cutting surfaces 12 of blades 5, so that, as the blades rotate with reel 4, grass is caught and cut between knife 10 and a cutting surface 12.

Returning to FIG. 1a, the preferred embodiment shown illustrates a mulching device 1 that comprises an elongate plate 13, across the underside of which is attached a series of planar parallel vanes 14. At each end of plate 13 is a side wall 15, also extending downwardly from the plate. A pair of clamps 16 are provided on the upper surface of plate 13, for attaching the device to shield 8, as can be more clearly seen in FIG. 2. By means of clamps 16 the mulching device is readily removable when desired for cleaning, repair, or increased access to the blades of the lawn mower, and, because it attached to the shield 8, the device can be fitted to substantially any mower.

The plate 13 may be provided, along its forward edge, with a hinged flap 17 to increase the downward deflection of cut grass closer to the oncoming blades 5. In cases where the bulk of the cut grass is excessive (i.e. the grass is overgrown or is wet) the flap 17 may be lifted open in order to allow better flow of the grass and to prevent clogging.

The mulching device 1 is preferably constructed of steel with the vanes 14 welded to the plate 13, but can be made of any suitable wear-resistant material, such as suitable plastics materials, aluminum or other metal.

As can best be seen in FIGS. 4 and 5, vanes 14 are attached to plate 13 at an angle to the perpendicular to the plate. The vanes 14 are preferably trapezoidal in shape, as shown in FIGS. 2 and 6, being a quadrilateral with two parallel sides and two ninety degree angles. The remaining acute angle is pointed into the discharge opening of the mower, and as shown in FIG. 2. Each vane 14 is thereby provided with an angled surface 18 that abuts and mates with the upper and inner surface of shield 8.

The series of planar vanes 14 are positioned substantially parallel to an axis running from the front to the back of the mower and at an acute angle relative to the top plate 13 sloping towards one end of the device 1. Because blades 5 are spiral they tend to throw cut grass to one side, rather than in an even stream across the outlet from the mower in the direction of travel of the mower. Vanes 14 are angled in the same direction of throw as blades 5 so that the cut grass from the mower blades 5 is deflected by vanes 14 without substantial loss of velocity, and is evenly dispersed directly in front of the lawn mower. Thus, it will be understood that the vanes could be directed in the opposite direction to that illustrated in the drawings.

When mounted on the lawn mower 2, the device 1 is positioned so that the lower edges of the vanes 14 are close to the blades 5, as shown in FIG. 2. Vanes 14 should not be so close to blades 5 that they interfere with each other, but should not be too far apart, otherwise cuttings tend to flow under and across mulcher 1 and avoid proper directing thereby. Typically, the space between the lower edges 19 of vanes 14 and the blades 5 will be about 3/16 to ½ inch. Similarly, to maximize the flow of cuttings through the mulching device 1, sidewalls 15 of device 1 abut the sidewalls 6 and 7 of the mower, to avoid significant leakage of cuttings at those locations.

Thus, because vanes 14 are close to blades 5 and mated to the inner surface of shield 8, they form between them, and the underside of plate 13, channels for conducting the cut grass and deflecting it downwards. As indicated above, that deflection may be increased by flap 17.

During operation, as the lawn mower 2 is moved forward and cuts the grass, a stream of cut grass is blown and driven through the passageway between the shield 8 and the blades 5. The quickly rotating blades 5 drive the cuttings through that passageway, assisted by an updraft of air which also acts to lift the cut grass to the mulching device 1. Because, in the preferred embodiment, the inner surface of the shield 8 is substantially smooth, impediment to that flow of cuttings is minimized. That flow is directed to the mulching device 1, and passes through the channels between the vanes 14 and plate 13 so that a significant portion of the grass cuttings is directed directly in front of the reel assembly 4 for more complete comminution. Without the device, a front discharge reel-type mower would discharge the grass cuttings up into the air and approximately 2-3 feet in front of the mower. In the invention, cut grass is thus thrown forward and downward to be swept up again by that reel 4 and further cut. If the grass has been cut sufficiently finely it will then settle into the lawn, otherwise it is cut again by the blades 5. This process is repeated until the grass is so finely cut that it forms a fine mulch deposited onto the lawn. The angularly positioned parallel vanes 14 direct the cut grass from the mower blades 5 so that the mulch is evenly dispersed in front of the lawn mower.

FIGS. 6 and 7 depict an alternative embodiment of the device where the planar parallel vanes 14 are attached only partially across the underside of the plate 13 beginning at one end of the device. This embodiment also utilizes a flap 17, preferable hinged, to the leading edge of the plate 13 for directing the grass toward the side of the device with the vanes 14. The side of the device with the vanes 14 is further fabricated with a raised hood 20 to allow for an increased volume of particulate matter.

While particular embodiments of the mulching device for a power reel-type mower have been shown and described, it will be appreciated by those skilled in the art that modifications and alterations may be made to the device as described without departing from the invention in its broader aspects. Various features of the invention are set forth in the following claims.

What is claimed is:

1. A lawn mower, comprising:
   a frame having depending side walls;
   a plurality of wheels supporting said frame and enabling said mower to travel over a turf surface;
   a motor mounted on said frame;
   an axially rotatable reel within said frame, said reel including a plurality of cutting blades, and extending substantially transversely to the direction of travel of said mower and being rotatably mounted between said side walls for rotation by said motor, said mower being adapted to travel along a turf surface and to cut grass by the rotation of said reel adjacent a cutting surface;
   an arcuate shield mounted between said side walls and behind said reel, said shield generally conforming to and mounted closely to the arcuate periphery defined by said blades when they rotate, said shield having a substantially smooth inner surface so that said surface and blades define between them an unobstructed passageway for said cut grass and an outlet from said passageway at the front of the mower for ejecting said cut grass forwardly; and
   a mulching device located in said outlet and comprising an elongate plate extending substantially across said outlet, said plate having an underside surface having a plurality of vanes, said vanes and said underside surface forming channels for directing, in use, said cut grass downwardly and in front of said mower so that a substantial portion of said cut grass is recycled through said mower for further cutting and eventual deposition upon said turf surface.

2. A mower as claimed in claim 1, wherein said vanes are substantially parallel to one another and are inclined at an angle to the perpendicular to said underside surface so that in use, said material is directed forwardly from said mower in the direction of travel of said mower.

3. A mower as claimed in claim 2, wherein said vanes are spaced substantially evenly across the underside of said plate.

4. A mower as claimed in claim 2, wherein said vanes are grouped to one end of the underside of said plate.

5. A mower as claimed in claim 1, wherein said plate has a forward edge along which is mounted or formed a downwardly projecting flap for increasing the downward deflection of said material.

6. A mower as claimed in claim 5, wherein said flap is hingeably attached to the said edge of said plate.

7. A mower as claimed in claim 5, wherein said flap comprises a generally rectangular skirt extending substantially vertically downward and close to the turf surface.

8. A mower as claimed in claim 1, wherein said device further comprises a plurality of clamps extending rearwardly of said plate and attaching said device to said shield or frame.

9. A mower as claimed in claim 1, wherein said arcuate shield conforms generally to the periphery defined by the reel blades while rotating, but does not extend forward of the top center of the reel.

10. A mower as claimed in claim 2, wherein said vanes are trapezoidal in shape, being a quadrilateral with two parallel sides and two ninety degree angles.

11. A mower as claimed in claim 10, wherein the acute angle of said vanes is pointed into the discharge opening of the mower.

12. A mulching device, adapted for mounting to a reel-type lawn mower, said device comprising:
   an elongate plate having an underside surface;
   a plurality of substantially parallel planar vanes depending from said surface, said vanes being arranged at an angle to the perpendicular to said surface;
   said device being adapted to fit in the grass discharge outlet of a reel-type lawn mower, said underside surface and said vanes forming channels to, in use on said mower, direct grass cut by said mower to be recycled through said mower for further cutting and deposition on the ground as a mulch.

13. A device as claimed in claim 9, wherein said vanes are spaced substantially evenly across the underside of said plate.

14. A device as claimed in claim 9, wherein said plate has a forward edge along which is mounted or formed a downwardly projecting flap for increasing the downward deflection of the cut grass.

15. A device as claimed in claim 11, wherein said flap is hingeably attached to said edge of said plate.

16. A device as claimed in claim 9, wherein said flap comprises a generally rectangular skirt extending substantially vertically downward and close to the turf surface.

17. A device as claimed in claim 9, wherein said vanes are located partially across the underside of said plate, beginning at one end of the device, this side having a raised hood to allow for increased flow volume of cut grass between said vanes and said plate and affording additional flow paths to collect and direct said cut grass through said device.

18. A device as claimed in claim 12, wherein said vanes are trapezoidal in shape, being a quadrilateral with two parallel sides and two ninety degree angles, one of said parallel sides being attached to said underside surface.

19. A device as claimed in claim 18, wherein the acute angle of said vanes is adapted to be pointed into the discharge opening of the mower, with the inclined side to be substantially mated with the surface of a shield in said mower that extends from below and behind the blades in said in mower.

20. A lawn mower comprising:
   a frame having a top wall and depending side walls, supported by a plurality of wheels;
   a motor mounted on said frame;
   a reel mounted within said frame for rotation by said motor, said reel including a plurality of cutting blades, and extending substantially transversely to the direction of travel of said mower, said mower being adapted to travel along a turf surface and to cut grass through the rotating action of said reel; and
   a mulching device located on said frame in closely spaced relationship to said reel, said device comprising a plate and a plurality of planar parallel vanes attached to the underside of said plate, such that the vanes are positioned with their edges close to the blades to form channels between the vanes and the plate affording flow paths for cut grass through said device, said vanes being located and arranged substantially parallel to an axis running from the front to the back of the mower and at an acute angle to the plate in order to direct the cut grass downwardly and in front of said rotating reel for recutting and eventual deposition upon said turf surface.

21. A mower as claimed in claim 15, wherein said mulching device is located along the top side of said reel.

22. A mower as claimed in claim 15, wherein a hinged flap is attached along the front edge of the plate to further increase the downward deflection of particulate material in front of the reel.

23. A mower as claimed in claim 15, wherein a generally rectangular skirt is attached along the forward edge of the plate and extends downward close to the turf surface.

24. A mower for cutting grass comprising:
   a housing;
   a rotatable reel in said housing and having blades for cutting grass;
   a motor connected to rotate said reel;
   a shield in said housing closely adjacent the back side of said reel for conducting cut grass between said blades and said shield upwardly and to a discharge opening where said shield terminates; and
   a mulching device extending from said opening for directing said cut grass discharged through said opening to said blades for recutting to form a fine mulch to be deposited on the ground, said device comprising a plurality of deflection surfaces and being attached to said shield or housing so that, in use, grass conducted by said shield is supplied to said device and impinges said deflection surfaces to be spread substantially evenly on the ground in front of the mower.

25. A mower as claimed in claim 24, wherein said defection surfaces comprise a series of substantially parallel ribs.

26. A mower as claimed in claim 25, wherein said ribs are arranged at substantially even intervals across the width of the area of discharge of cut grass from the mower.

27. A mower as claimed in claim 25, wherein said ribs are disposed at an angle to the predominant direction of discharge of cut grass from the mower, so as to redirect that discharge in the direction of travel of the mower and to spread said cut grass substantially evenly over the ground in the path of the mower.

28. A mower as claimed in claim 24, wherein said housing conforms generally to the periphery defined by the reel blades while rotating, but does not extend forward of the top center of the reel.

29. A mower as claimed in claim 24, wherein said deflection surfaces are trapezoidal in shape, being a quadrilateral with two parallel sides and two ninety degree angles.

30. A mower as claimed in claim 29, wherein the acute angle of said deflection surfaces is pointed into the discharge opening of the mower and the angled side of said deflection surfaces substantially mates with the surface of said shield.

31. A method of mulching cut grass comprising the steps of:
- moving grass with a mower having a rotating reel having blades for cutting grass:
- conducting cut grass between said blades and a shield in said mower to a discharge opening where said shield terminates; and
- directing at least some of said cut grass discharging through said opening to a plurality of deflection surfaces so that the cut grass impinges said deflection surfaces and is deflected downwardly and is swept up by said rotating reel and recut until it is too fine to be cut further, said method further comprising spreading said fine cut grass substantially evenly on the ground in front of the mower to form a fine mulch on the ground.

* * * * *